No. 647,724. Patented Apr. 17, 1900.
L. McCOY.
RAKE.
(Application filed Nov. 22, 1899.)
(No Model.)

Witnesses
Edwin B. H. Tower, Jr.
Herbert D. Lawson

Inventor
Lawrence McCoy
By Edson Bros.
Attorneys

THE NORRIS PETERS CO., PHOTO-LITHO., WASHINGTON, D. C.

UNITED STATES PATENT OFFICE.

LAWRENCE McCOY, OF BROCKPORT, NEW YORK.

RAKE.

SPECIFICATION forming part of Letters Patent No. 647,724, dated April 17, 1900.

Application filed November 22, 1899. Serial No. 737,920. (No model.)

*To all whom it may concern:*

Be it known that I, LAWRENCE MCCOY, a citizen of the United States, residing at Brockport, in the county of Monroe and State of New York, have invented certain new and useful Improvements in Rakes; and I do hereby declare the following to be a full, clear, and exact description of the invention, such as will enable others skilled in the art to which it appertains to make and use the same.

This invention relates to a new and useful improvement in rakes, and is especially designed for removing mowed grass, standing weeds, &c. Its object, among other things, is to provide a durable device of simple and inexpensive construction and which is efficient in operation; and it consists in forming a recurved box-like head provided along one edge with teeth of peculiar construction.

The invention also consists in the further novel constructions and combinations of parts hereinafter more fully described and claimed, and illustrated in the accompanying drawings, showing the preferred form of my invention, and in which—

Figure 1:
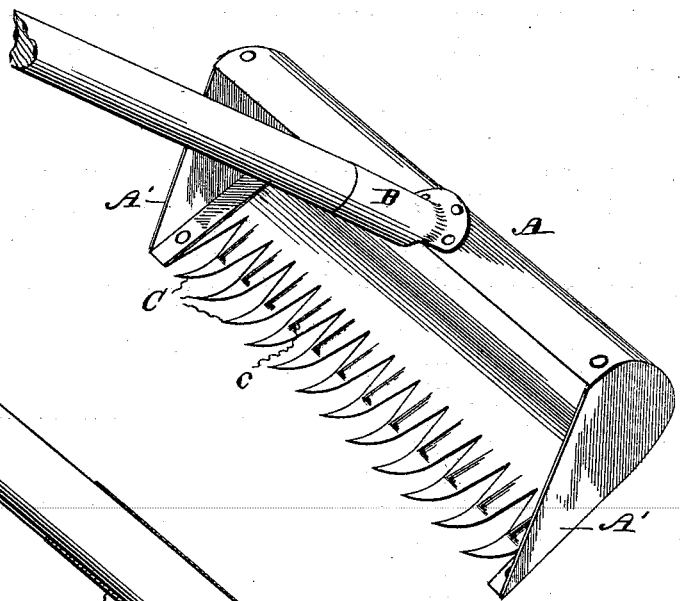
Figure 2:
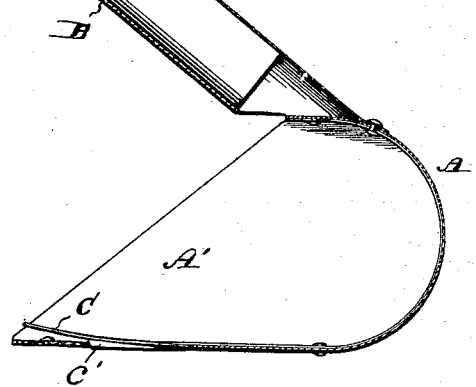
Figure 3:
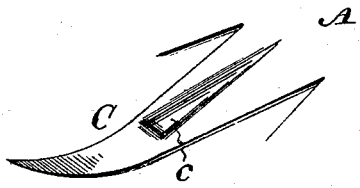

Figure 1 is a perspective view of the device. Fig. 2 is a central transverse section therethrough. Fig. 3 is an enlarged detail view of a tooth.

Referring to said figures by letters of reference, A is the body portion of the rake, preferably formed of a recurved sheet of steel inclosed at the side by means of plates A', suitably secured thereto and provided at the center of its upper edge with a socket B for the reception of a suitable handle. The lower edge of the body portion A is provided with a series of pointed teeth C, preferably provided with cutting edges having upwardly-curved ends, as shown. A longitudinal groove c is preferably stamped into the upper surface of each tooth, forming a corresponding bead c' upon the under surface thereof, for the purpose hereinafter described.

In operation the rake is drawn over the ground, thereby causing the teeth thereof to engage with the grass, &c., to be gathered or to cut the same and deposit it within the box-like body portion A. The end of each tooth is upwardly curved, as shown, to prevent its engagement with the ground, while the beads c' serve not only to strengthen the teeth, but also as runners therefor and maintain the cutting edges thereof above the ground. As the sides A' of the body project horizontally beyond the ends of the teeth, it is obvious that they serve as an additional means for holding the ends of the teeth out of contact with the ground, especially when the rake is tilted downward.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

Having thus fully described my invention, what I claim as new, and desire to secure by Letters Patent, is—

1. In a rake the combination with a body portion, of teeth on one edge thereof, and a bead on each tooth, substantially as described.

2. In a rake, the combination, with the body portion, of upwardly-turned teeth on one edge thereof and a bead on each tooth, and integral therewith, substantially as described.

3. In a rake, the combination, with the partially-inclosed body portion, of the horizontally-projecting ends thereof, a socket thereon, a series of upwardly-curved teeth, and a longitudinal bead on each tooth, substantially as described.

In testimony whereof I affix my signature in presence of two witnesses.

LAWRENCE McCOY.

Witnesses:
CHAS. LEMON,
C. E. MARTIN.